United States Patent [19]

Ribnitz

[11] Patent Number: 4,883,506
[45] Date of Patent: Nov. 28, 1989

[54] ELECTROSTATIC POWDER COATING INSTALLATION AND METHOD OF OPERATING THE SAME

[76] Inventor: Peter Ribnitz, Haselstrasse 15, 9013 St. Gallen, Switzerland

[21] Appl. No.: 188,072

[22] Filed: Apr. 28, 1988

Related U.S. Application Data

[63] Continuation of Ser. No. 913,254, Sep. 30, 1986, abandoned, which is a continuation-in-part of Ser. No. 648,744, Sep. 10, 1984, Pat. No. 4,647,298.

[30] Foreign Application Priority Data

Sep. 8, 1983 [CH] Switzerland ............. 4904/83
Nov. 29, 1983 [CH] Switzerland ............. 6366/83

[51] Int. Cl.$^4$ ............................. B01D 46/04
[52] U.S. Cl. ............................. 55/96; 55/290; 55/294; 55/297; 55/351; 118/326; 427/27
[58] Field of Search ............. 55/96, 290, 294, 296, 55/297, 351, 352, DIG. 46; 118/326, 629, 632, 634, DIG. 27; 427/27

[56] References Cited

U.S. PATENT DOCUMENTS

| | | | |
|---|---|---|---|
| 3,303,635 | 2/1967 | Sherrill | 55/294 X |
| 3,555,785 | 1/1971 | Wooldridge et al. | 55/96 |
| 4,153,008 | 5/1979 | Marino et al. | 118/634 |
| 4,221,576 | 9/1980 | Phillips | 55/352 |
| 4,257,345 | 3/1981 | Brice | 118/634 |
| 4,260,400 | 4/1981 | Scalet | 55/290 |
| 4,293,320 | 10/1981 | Robinson | 55/294 X |
| 4,509,961 | 4/1985 | Jones | 55/294 |

FOREIGN PATENT DOCUMENTS

0141778 3/1988 European Pat. Off. .

Primary Examiner—Charles Hart
Attorney, Agent, or Firm—Antonelli, Terry & Wands

[57] ABSTRACT

An electrostatic powder coating installation which includes a cabinet for accommodating a device for producing electrostatically charged powder, with a filter strip being disposed in the cabinet at a bottom end thereof. A suction system is provided which includes at least one movable suction nozzle and one suction air duct functionally connected with the suction nozzle with a suction blower. The suction nozzle is functionally connected with a drive belt, with the belt moving the nozzle transversely to the suction air duct. The suction nozzle is reciprocated by at least one motor driven belt, with the belt simultaneously serving as a sealing element for a slot provided along a length of the suction air duct.

15 Claims, 5 Drawing Sheets

ELECTROSTATIC POWDER COATING INSTALLATION AND METHOD OF OPERATING THE SAME

This application is a continuation-in-part application application Ser. No. 648,744, filed on Sept. 10, 1984, now U.S. Pat. No. 4,647,298.

BACKGROUND OF THE INVENTION

The present invention relates to a coating installation and method of operating the same, and, more particularly, to an electrostatic powder coating installation which includes a cabinet or housing accommodating a means for discharging electrostatically charged powder, a filter strip, located at a floor or base of an inner space of the cabinet and being capable of being moved or displaced through the cabinet, a first suction fan, having a large surface area, installed in an area of the bottom of the cabinet for generating a suction field with a vacuum in the cabinet through the filter strip, cleaning means associated with the filter strip for removing surplus powder lying on the filter strip, and a powder recovery means for the electrostatic powder coating installation which includes a sifting machine, a basket for sifting material, a dirt- or contaminant-catching container, a filtering device, a fan, and a floor or base member which is at least partially fluidizing and a powder drawing element.

In, for example, European Pat. No. 0 141 778, a suction system for powdered material, especially powder coating chambers with at least one movable suction nozzle and at least one suction air duct functionally connected with the suction nozzle, is proposed, with the duct having a suction fan or blower, and with the powder coating chamber being provided with a bottom filter and a movable suction nozzle, bottom pan, and suction blower or fan whereby it is possible to carry sprayed powder by a shortest route back to a dispensing container.

A disadvantage of this proposed system resides in the fact that certain problems develop in the coating chamber with regard to a transition from the longitudinally displaceable nozzle to the suction system.

More particularly, in the proposed suction system of the above-noted European patent application, in the coating chamber, the filter belt is stationary during a coating process, with a nozzle traveling back and forth over an entire length of the belt, and with the falling powder being collected through slots. Since a connection of the nozzle to the exterior is accomplished by a hose, the hose is always in a vicinity of the coating operation thereby creating considerable problems.

In, for example, Auslegeschrift No. 2,546,920 and U.S. Pat. No. 4,245,551, an apparatus of the aforementioned type, arranged in the cabinet or housing, is proposed; however, one of the biggest problems or disadvantages of the proposed apparatus resides in the fact that the proposed systems are complex and too much time is lost when the pigment is changed.

More particularly, in the installation described in U.S. Pat. No. 4,245,551, it is necessary to replace the entire filter unit when the pigment changes. However, the filters are relatively expensive and, the system is relatively large therefore a considerable amount of space is required for each pigment. In this connection, replacing a filter unit, normally in the form of pocket filters or cartridge filters is difficult and, with this proposed system, one structural unit is always required for each pigment.

In the aforementioned Auslegeschrift, it is necessary to replace the filter strips for each pigment and generally at least two people are required to change the strips. Furthermore, the filter strips have to be stored separately and, in many cases, the situation arises that two or more suction units must be provided to minimize the time consumed in changing the pigment.

Swiss Application No. 4,904/83-2 also provides an example of an electrostatic powder coating apparatus; however, as with the above-noted United States patent and the Auslegeschrift, the apparatus and associated process are relatively complicated and require substantial investment to manufacture the apparatus all of which constitute obstacles to a widespread use of an electrostatic powder coating apparatus. Moreover, in the proposed apparatus the suction removal, sifting and returning of the powder is very elaborate and very expensive.

The same complex problems arise in a direct removal of the powder by suction in a coating procedure for special uses such as, for example, in coating the seams of cans. In the systems which have been proposed, the powder, removed by suction, is precipitated from the air in a filter and falls on a floor or base of the filter housing and, from there, the powder is conveyed to a sifting machine either by an intermediate conveying device through a mini-cyclone separator and a bucket wheel sluiceway or squeeze valve. From there the cleaned powder is directly forwarded to the powder container.

The aim underlying the present invention essentially resides in providing a multipigment electrostatic coating installation and method of operating the same which avoids, by simple means, shortcomings and disadvantages encountered in the prior art.

In accordance with advantageous features of the present invention, an electrostatic powder coating installation is provided which includes a means for pulling or drawing a filter strip for at least one length of the cabinet or housing of the installation when the pigment changes thereby assigning a filter strip zone to every pigment.

In accordance with still further features of the present invention, to achieve a significant structural simplification, elements generally employed in the prior art installations especially elements which tend to break down are eliminated. More particularly, bucket wheel sluiceways which tend to get jammed when loaded with powder or squeezing valves which have a high rate of wear and tear on the rubber and cause the powder to cake so as to prevent satisfactory operation need not be provided nor is it necessary to provide an intermediate conveying apparatus which requires additional compressed air and associated components which are also susceptible to wear and tear.

In accordance with the present invention, the recovery apparatus of the electrostatic powder coating installation includes a direct powder feed pipe leading to a sifting machine. Moreover, the basket for sifting material and the filtering apparatus are disposed in the same enclosed space and, by virtue of such location, a means are provided for transporting powder away to carry the powder which is sifted out by the sifting machine and the powder which falls on the filtering apparatus so that the powder can be used again with the entire structural unit being replaceable as a module.

Advantageously, in accordance with the present invention, a suction nozzle is provided which includes a propulsion adapted to move the suction nozzle along the filter strip. The suction system of the present invention is adapted to operate intermittently and a fibrous web, preferably one that can be rolled and unrolled is disposed beneath the filter strip.

According to the present invention, the suction system for powdered material, especially for a powder coating chamber of an electrostatic powder coating installation, includes at least one movable suction nozzle and at least one suction air duct, with a suction fan or blower being functionally connected with the at least one suction nozzle. The at least one suction nozzle is functionally connected with at least one drive belt for moving the at least one nozzle with respect to an air suction channel, which channel is open along one longitudinal side thereof and sealed by the drive belt.

The powder coating chamber of the present invention includes a bottom filter and a movable suction nozzle, bottom pan, and suction fan or blower, with the suction nozzle being moved back and forth by a belt and drive motor arrangement, and with the belt simultaneously serving as a sealing element for a slot of an air suction exhaust duct.

Advantageously, the belt is interrupted and fastened to transverse guide frame means whereby the powder-air stream can pass through the nozzle and through a section in a guide frame in each position into the longitudinally air suction exhaust duct.

The nozzle, in accordance with the present invention, may be inserted in a guide frame and include one or more elements sealed against one another by resilient or rubber lip members.

The longitudinally extending air suction exhaust duct may include a section which is provided over an entire belt length with a longitudinal slot and sealed at the ends with removable cover means for facilitating a cleaning. The belt may, for example, take the form of a toothed belt.

It is also possible in accordance with the present invention for a slotted duct to be provided on each side of the chamber and optionally provided nozzle elements installed so that suction can be shifted alternately depending upon the color of the powdered material from one side to the other in the longitudinal duct.

The longitudinally extending air suction exhaust duct, in addition to a return connection, has at least one additional connection which is adapted to connect a suction hose when cleaning the coating chamber. To facilitate a driving of the drive motor, an appropriate slip clutch may be provided in the belt drive system.

Preferably, in accordance with still further features of the present invention, an entrance feed pipe into the sifting machine is arranged tangentially and an air suction device is located at one end of the sifting machine to generate a potential sump in the machine.

The longitudinal axis of the sifting machine may, in accordance with the present invention, be inclined in a direction of the container for catching dirt or contaminants and the apparatus may be arranged in such a manner that a cleaning by filtering can take place right in the filtering space of the shifting machine individually or in blocks thereby making a continuous operation possible.

At least a floor or base member of the filtering space of the sifting machine is made of porous material and, preferably, the floor or base is inclined.

Advantageously, the individual units of the powder coating installation and, for example, the powder container are replaceable and, preferably, without the use of any specialized tools.

In accordance with the method of electrostatic powder coating of the invention, during a spraying, the filter strip is moved only when the pigment changes to get a portion of the filter strip associated with the new pigment ready inside the cabinet or housing. Moreover, the suction nozzle of the electrostatic powder coating installation is preferably operated intermittently.

The contaminant- or dirt-catching container of the electrostatic powder coating installation of the present invention is advantageously maintained at the same pressure level as an area containing the filter and sifting machine is sealed off.

Accordingly, it is an object of the present invention to provide an electrostatic powder coating installation, powder recovery installation for the electrostatic powder coating installation, and a method for operating the electrostatic powder coating installation which is simple in construction and therefore relatively inexpensive to manufacture.

A further object of the present invention resides in providing an electrostatic powder coating installation, powder recovery installation for the electrostatic powder coating installation and a method for operating the installation which is relatively small and which dispenses with the need for various conventional elements while nevertheless achieving the same separation characteristics and degree of effectiveness.

A still further object of the present invention resides in providing an electrostatic powder coating installation and a powder recovery installation for the electrostatic powder coating installation which functions reliably under all operating conditions.

Yet another object of the present invention resides in providing a suction system for powdered material, especially for powder coating chambers of electrostatic powder coating installations which enables the provision of an air path for suction and cleaning and which simplifies color changing in the coating installation. Another object of the present invention resides in providing a powder coating chamber which includes a displaceable suction nozzle movable back and forth by a belt and drive motor, with the belt simultaneously serving as a sealing element for a slot of an air suction exhaust air duct.

These and other objects, features, and advantages of the present invention will become more apparent from the following description when taken in connection with the accompanying drawings which show, for the purposes of illustration only, several embodiments in accordance with the present invention.

DETAILED DESCRIPTION

Figure 1:
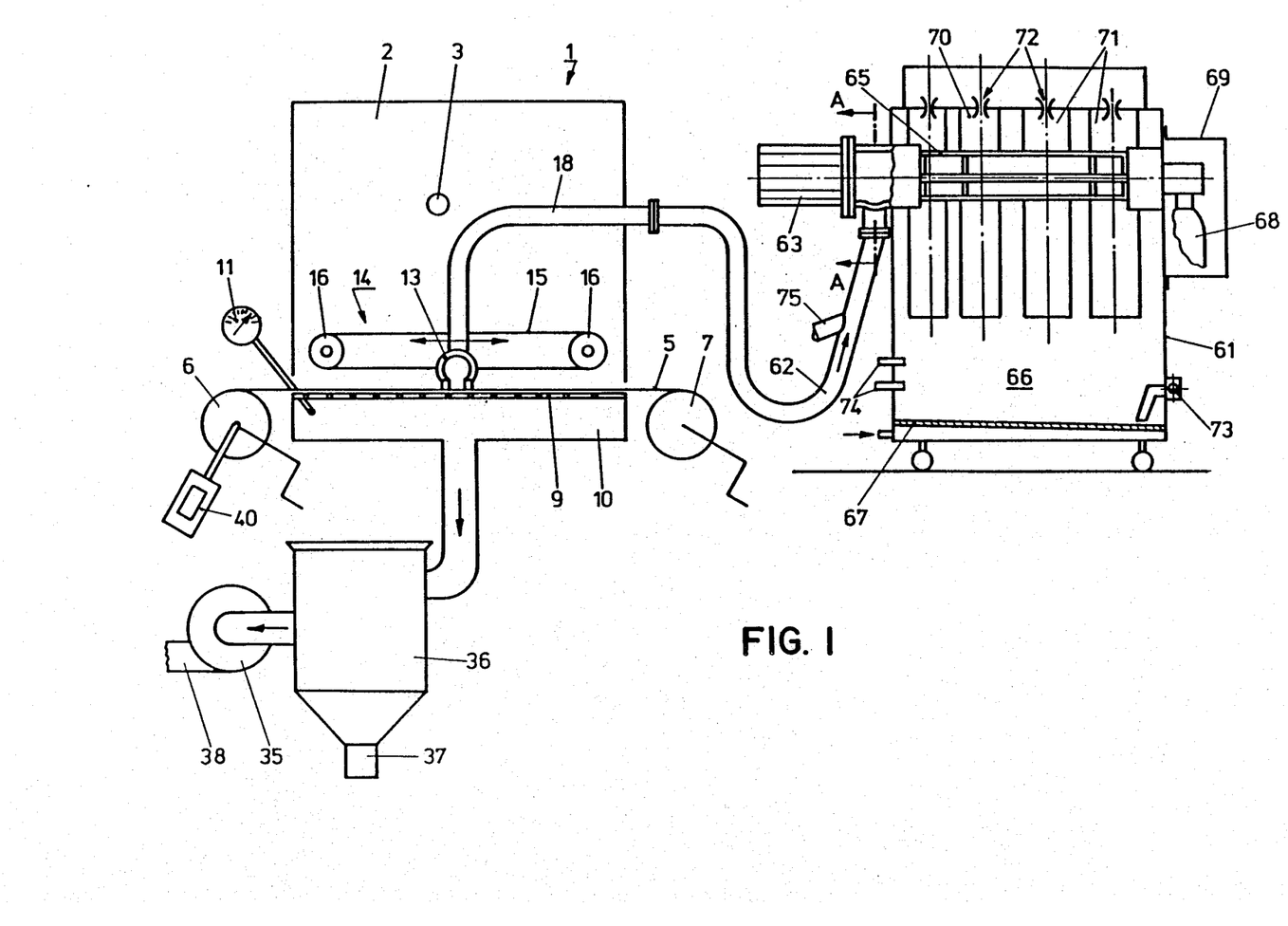
FIG. 1 is a schematic view of an electrostatic powder coating installation and recovery apparatus constructed in accordance with the present invention.

Referring now to the drawings wherein like reference numerals are used throughout the various views to designate like parts and, more particularly, to FIG. 1, according to this figure, an electrostatic powder coating installation generally designated by the reference numeral 1 includes a cabinet or housing 2 accommodating a gun for spraying or dispensing electrostatically charged powder or pigment particles onto an object to be coated in a conventional manner. A filter belt or strip 5, disposed at a lower end of the cabinet 2 is stretched over actuator means which includes two rollers 6, 7, with each of the rollers 6, 7 being provided with an appropriate drive mechanism (not shown) for enabling the filter strip or belt 5 to be retracted by at least one length of the cabinet when changing colors, whereby each color is allocated a portion or a zone of the filter strip 5.

A support grating 9 is disposed above a floor or bottom of the cabinet 2 and beneath the filter belt or strip 5, with a portion of the cabinet 2 located under the support grating forming a trough 10. A pressure differential member is provided for measuring a vacuum prevailing in the trough 10 during operation, with the vacuum serving as a determining or control parameter for controlling the powder coating installation 1. A first suction blower or fan 35 is connected over a large area in a vicinity of the trough 10 of the cabinet 2 and is adapted to create a suction field with a vacuum extending through the filter strip or belt 5 into the chamber 2.

A suction nozzle 13, fastened to a nozzle actuator generally designated by the reference numeral 14, is disposed above the filter strip 5 and in close contact therewith and serves to remove excess powder lying on the filter strip 5. The actuator 14 includes an endless strip or chain 15 disposed over two driven guide pulleys 16 so as to permit the suction nozzle 13 to be selectively reciprocated back and forth over the filter strip 5 in the cabinet 2 and permit the suction nozzle 13 to be stopped at a specific location during a coating operation. The suction nozzle 13 is connected with a recovery installation by a hose 18 which flexes or bends in accordance with a location of the suction nozzle 13 during an operation of the coating installation 1.

As also shown in FIG. 1, the recovery installation includes a base frame 61 in which the other elements are installed, with a mixture of powder and air being delivered to a sifting machine 63 through a feed pipe 62. Advantageously, the axis of the sifting machine 63 is inclined by approximately 5° or 10° and has a tangential air intake (FIG. 5) since a potential sump comes into being as a result of that and, with the help of an exhaust fan 64, and a centrifuging a uniform deposit of the powder in the basket 65 for the sifting material results. By virtue of this arrangement, a screw conveyor which is usually used in sifting machines is eliminated and thus another element which can malfunction or breakdown is eliminated and, by virtue of the elimination of the screw conveyor, the total price of the installation can be substantially reduced. Since the sifting machine 63 is installed directly in the powder container 66, the cleaned powder falls directly on a fluidizing floor or base member 67 and is immediately reused. On a side opposite the powder intake in the sifting machine 63, a dirt or contaminant-catching container or sack 68 is installed which is adapted to catch dirt particles or the like in the powder which are not sifted out in the basket 65 for the sifting material. In order to provide for the same conditions of pressure for the sifting machine 63, the dirt or contaminant-catching container 68 is sealed off from the environment by a thick housing 69 which is adapted to be quickly removable. A rapid cleaning and replacement of the basket 65 for the sifting material is made possible by removing the housing 69. The basket 65 for the sifting material is locked in position with, for example, snap closures and rubber buffer members thereby making the maintenance considerably easier. In addition to the sifting machine 63, a filter battery 70 is installed in an upper part of the housing so as to create a space with the same pressure in which the sifting machine 63 and the filter are installed. The number of filter cartridges 71 of the battery 70 depends on the amount of air to be processed and, as can readily be appreciated, the filter cartridges 71 can be disposed horizontally. Customarily, the manner in which the various elements are installed is such that the amount of space in the housing is maintained as small as possible and, for example, pocket filters may be employed instead of the filter cartridges 71.

Figures 4, 5:
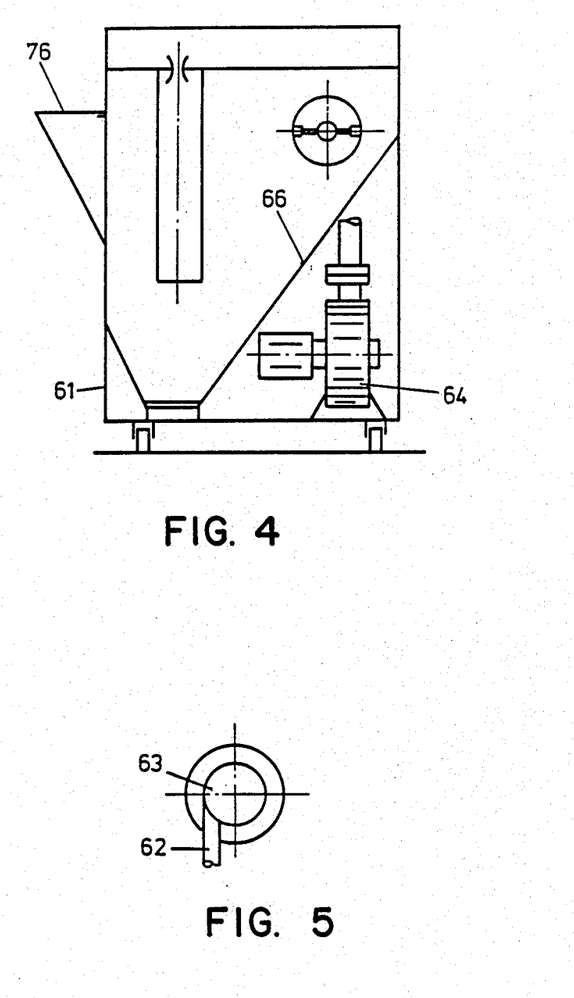
FIG. 4 is a side view of the powder recovery installation of FIG. 1.
FIG. 5 is a cross-sectional view taken along the line A—A in FIG. 1.

The filter battery 70 separates the powder from the powder-air mixture contained in the space and emerging from the basket 65 for the sifting material and swirled by the fluidizing period. Nozzles 72 are provided for blowing compressed air cyclically or pressure-dependently into one or more of the filter cartridges 71 in a direction opposite to a normal direction of air flow so that a cleaning of the filter cartridges 71 takes place in a conventional manner. The powder flows onto the floor or base member 67 and is immediately available for further use. The floor or base member 67 is made of a porous material so that a fluidizing of the powder can be accomplished. The floor or base member 67 is, advantageously, slightly inclined at, for example, 5°-10° so that one or more suction nozzles 73 may be attached at one side and the powder can be removed from the floor or base member 67. A maximum height of the accumulation of powder can be monitored and controlled by a powder level probe 74. A delivery of fresh powder can be accomplished directly in the return pipe 62 through a connecting adapter 75. The advantage of this procedure lies in the fact that the fresh powder is also already sifted. It is also possible in accordance with the present invention to manually put the powder in the installation through a filling cap 76 (FIG. 4).

Figure 2:
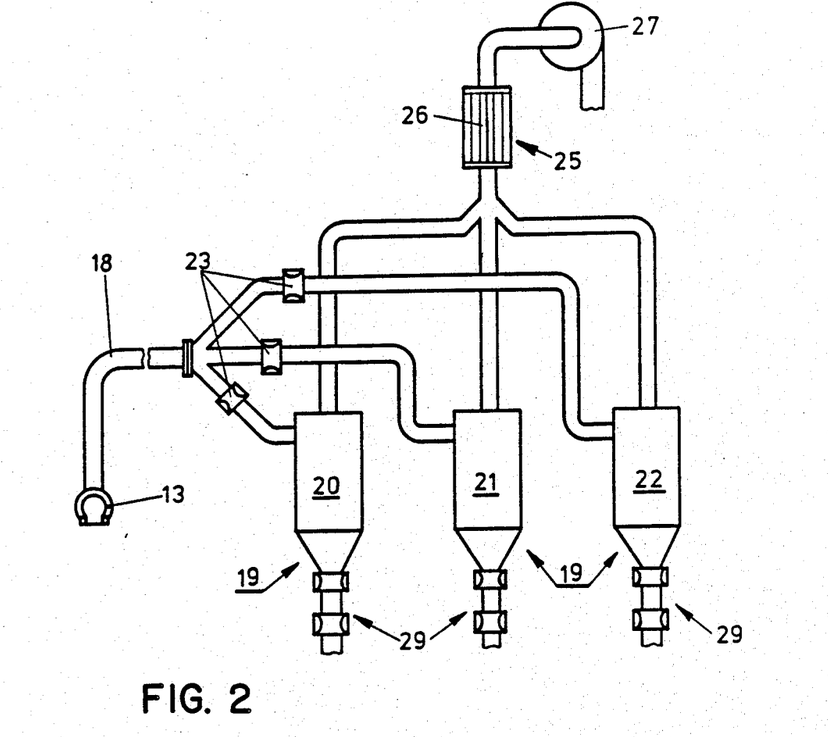
FIG. 2 is a schematic view of another embodiment of an electrostatic powder coating installation constructed in accordance with the present invention provided with individual pigment separators.

As shown most clearly in FIG. 2, appropriate squeezing valves 23 may be provided for connecting desired different pigments, deposited in cyclone separators 20, 21, 22, with the suction nozzle 13, so that the proper conveying routes are open in dependence upon the amount of material to be processed to convey the portions of the pigment which have fallen onto the filter strip 5 during a spraying into the proper cyclone separator 20, 21, or 22.

A fine filter 25 with filter cartridge 26 is installed after the cyclone separators 20, 21 22, with an exhaust fan 27 being provided for exhausting air which has ben substantially completely cleaned in the fine filter 25 into the atmosphere.

A powder sluiceway generally designated by the reference numeral 29 is disposed beneath each cyclone separator in the dust separating battery 19, which sluiceway 29 is, in the illustrated embodiment, fashioned of two squeezing valves. A sifting machine (not shown) with a storage bin may be disposed beneath the sluiceway 29 for accommodating separated fragments of pigments which can once again be reused. A suction intake fan 35, having a large surface area, is installed on the bottom of the trough 10 with a fine filter installation 36 and a dust collector 37 being disposed upstream of the suction intake fan 35. The cleaned air escapes through an exhaust pipe 38. A meter 40 is provided so as to enable a determination of the positioning of the filter strip 5.

When the electrostatic powder coating installation 1 is in operation, a certain section of the filter strip 5 is associated with each pigment of the coating and a cyclone separator 20, 21, or 22 is also associated with the respective pigments. When the pigment is changed, the filter strip 5 is moved for a distance at least a length of the cabinet 2 so that either an uncolored part of the filter strip 5 is in the cabinet 2 or a part of the filter strip which has been sprayed with the next pigment is located in the cabinet 2. Depending on the particular pigment used, one of the cyclone separators 20, 21, 22 in the dust separating battery 19 will be used and the corresponding squeezing valve 23 will be opened and the former valve for the previously used pigment will be closed. The squeezing valve 23, filter 36, and container 37 are also associated with the respective cyclone separators 20, 21, 22 in accordance with the specific pigments allocated to them and the same is the case with the filter cartridges of the fine filters 25. Thus, it is only necessary to clean the hose 18 and the suction nozzle 13 when the pigment is changed. As far as the other elements of the installation are concerned, a changing of the valves takes care of the making of the appropriate changes when the pigments are changed.

In order to reduce the energy consumption, a removal by suction by the suction nozzle 13 need not be continuously carried out but the suction can take place discontinuously or intermittently. In this way, it is also possible to clean the fine filter 25 automatically or manually during operation and to maintain a good level or separation with correspondingly low pressure losses in the filter cartridge 26.

By moving or displacing the filter strip 5 in a forward direction, zone by zone, as the pigments change, maximum use can be made of the filter strip 5 while the construction thereof becomes particularly simple since it is not necessary to provide a lower return run or strand of the filter strip 5.

When the pressure differential meter or gauge 11 indicates an underpressure of approximately 100–120 mm WS opposite the upper part of the chamber, this indicates that the filter strip 5 or the corresponding section of the filter strip 5 is saturated with particles of pigment and therefore the section of the filter strip 5 must be cleaned. One significant advantage of an installation employing a filter strip 5 such as proposed by the present invention resides in the fact that since the cloth on the sides of the two rollers 6, 7 is rolled up, it is extremely easy, when the pigment changes, to find the area of the corresponding shade of pigment either manually or automatically through the meter 40. In this manner, the suction system is considerably simplified and it is no longer necessary to provide a continuous cleaning system since no loss of powder occurs when the filter 25 is cleaned, although no powder is removed by suction for a short period of time of, for example, approximately seven seconds.

Another advantage of the coating installation 1 of the present invention resides in the fact that the cleaning of the filter strip 5 can be controlled through the differential pressure meter 11. When this is carried out, it is important for an approximately constant pressure to prevail in the cabinet 2 so that the amount of air removed by suction by the fan 35 can be approximately constant and, as a result thereof, the coating procedure can be carried out in the best possible manner. The life of the filter strip 5 is also considerably extended in this manner as compared with filter strips which circulate constantly as has been the case with previously proposed coating installations. Moreover, a changing of the return system in accordance with the pigment which is to be used can take place automatically since the squeezing valves controlled, for example, by compressed air, are capable of being activated depending upon the position of the filter strip 5. Relatively speaking, the various pigment cyclone separators 20, 21, 22 are relatively small and, for example, may have a height of above 1 mm and a diameter of 25 cm; therefore, if necessary, it is relatively inexpensive to replace the cyclone separators at a relatively low cost. The fine separation of the cloth filters in the fine filter 25 protects the exhaust fan 27 from getting out of balance as a result of an accumulation of pigment dust since any accumulated quantities of the pigment dust are too small to have a harmful or adverse effect on the exhaust fan 27.

Figure 3:
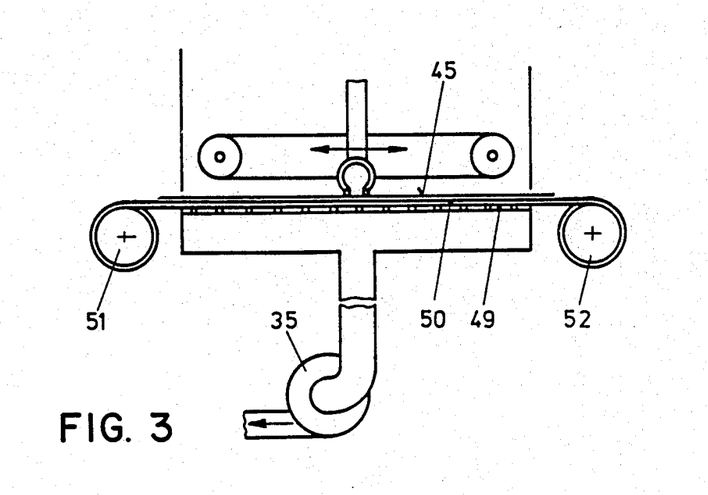
FIG. 3 is an enlarged detail view of a lower portion of a cabinet or housing for an electrostatic powder coating installation constructed in accordance with the present invention.

By virtue of the fact that the slub or twisted portion of the filter strip 5 is always carried along from the filter strip by the relatively strong suction from the suction nozzle 13, it is extremely difficult to separate this portion from the particles of pigment thereby creating another problem with coating installations of the type contemplated by the present invention; however, the construction of FIG. 3 takes into consideration this problem.

More particularly, in FIG. 3, a ribbon-like surface filter 45 is stretched out in the cabinet 2, with the filter 45 being constructed so as to advantageously not produce any lint and also advantageously being capable of being thoroughly cleaned with the nozzle 13 even when the pigments are changed. A support grating 49 is disposed under the filter 45 and a strip of fibrous web 50 is provided between the filter 45 and the support grating 49 which can be pushed over two rollers 51, 52 and selectively rolled and unrolled. The filter 45 is constructed so as to be more penetratable by air than the filter strip 5 and two rollers 51, 52 are provided for selectively moving the fibrous web 50. The underpressures detected by the pressure differential meter 11 determine, for example, whether to operate the installation or to change the strip of the fibrous web 50. Consequently, spraying with several pigments may be carried out in the cabinet 2 without removing the filter 45. At the same time, the relatively inexpensive fibrous web 50 serves for the purpose of protecting the fan 35 and thus it is possible to eliminate the use of the filter 36.

Normally, during operation, an underpressure or vacuum of between 300 and 600 WS prevails at a mouth of the suction nozzle 13, with a quantity of air from 300 to 500 m$^3$/Std. exiting through the exhaust fan 27. Naturally, powder is also drawn into the fibrous web 50 from the coarser filter 45 but the powder remains in the strip of the fibrous web 50 so that losses of the pigment also remain within predetermined limits while the lint or other contaminants which otherwise gets into the spray gun are also separated from the powder.

By virtue of the above-described arrangement of the coating installation 1, it is possible to avoid the disadvantages of electrostatic powder coating installations of the prior art. Moreover, the above-described recovery installation makes it possible to replace the same as a complete structural unit or to connect the same to an existent structural unit such as an electrostatic powder coating installation. Moreover, the present invention contemplates the replacement of the major elements of the electrostatic powder coating and installation which are generally subject to normal wear and tear with fastening means which are easy to remove without, for example, the use of any special tools. Among these units are the powder container 66 together with the filter cartridge 71.

Figure 6:
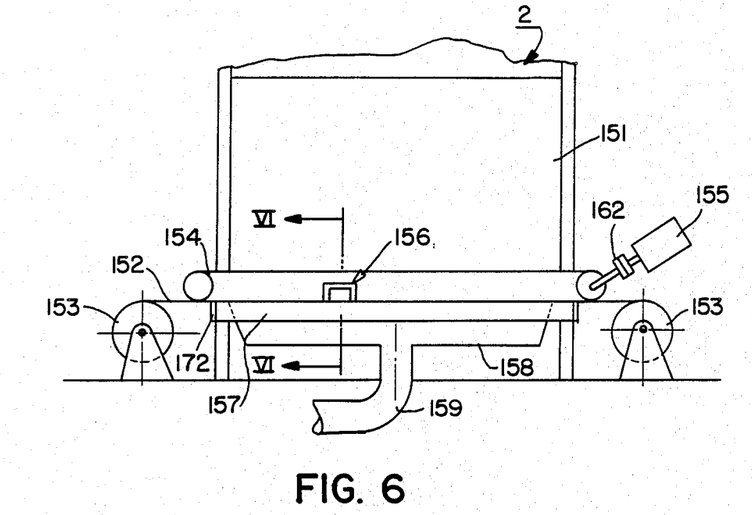
FIG. 6 is a schematic side view of a sprayer coating chamber constructed in accordance with the present invention.
Figure 7:
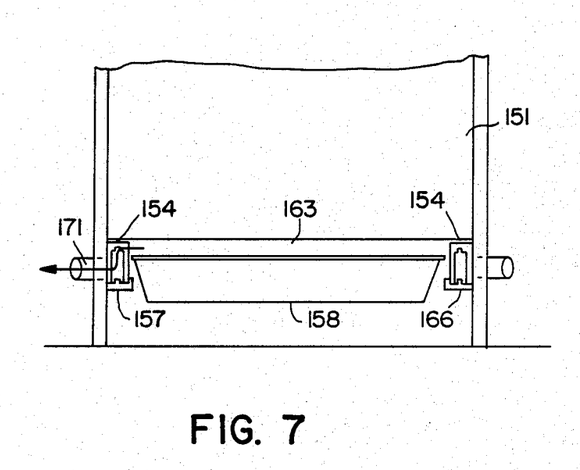
FIG. 7 is a front elevational view of the sprayer coating chamber of FIG. 6.

As shown in FIG. 6, the cabinet 2 includes a coating chamber 151 defined by a plurality of sheet metal walls, with a belt-shaped bottom filter 152 being attached at respective ends thereof to rollers 153, with each of the rollers 153 being provided with an appropriate drive mechanism (not shown) for 10 enabling the belt-shaped bottom filter 152 to be advanced by at east one length of the chamber 151. Exhaust air is drawn to the outside through a bottom trough 158 and an exhaust duct 159 by way of a suction fan or blower. (not shown) corresponding to the suction blower or fan 35 shown in FIG. 1.

A suction nozzle 156, corresponding to suction nozzle 13 described hereinabove, is provided for enabling a cleaning of the filter 152, with the suction nozzle 156 being driven by one or more drive belts 154 and a drive motor 155. The suction nozzle 156 is disposed above the filter 152 and is in contact therewith. The two opposed drive belts 154 are constructed as toothed belts and are coupled by a connecting shaft (not shown) in order to obtain a synchronous operation.

It is important for a suction system such as contemplated by the present invention that the air distribution at the bottom belt filter 152 be uniform for suction in order to prevent overloads on the individual segments or zones of the filter 152. For cleaning and color changes however, the bottom of the chamber 151 must be completely accessible. For this purpose, the bottom trough or pan 158 is covered with a perforated sheet member 161 having a diameter in a range of 5 to 20 cm. A plastic belt member 160 is disposed on top of the perforated sheet 161, with the plastic belt 160 having openings which may be round or rectangular and may be in the range of, for example, 3-10 mm in diameter or along a side thereof thereby further improving air flow and also avoiding damage to the belt or filter 152 when the same is displaced by driving the rollers 153. A slip clutch 162 (FIG. 6) is employed in the toothed belt drive of the belts 154 so as to prevent injury to operators by the moving nozzles 156 when changing colors in the installation.

Figure 8:
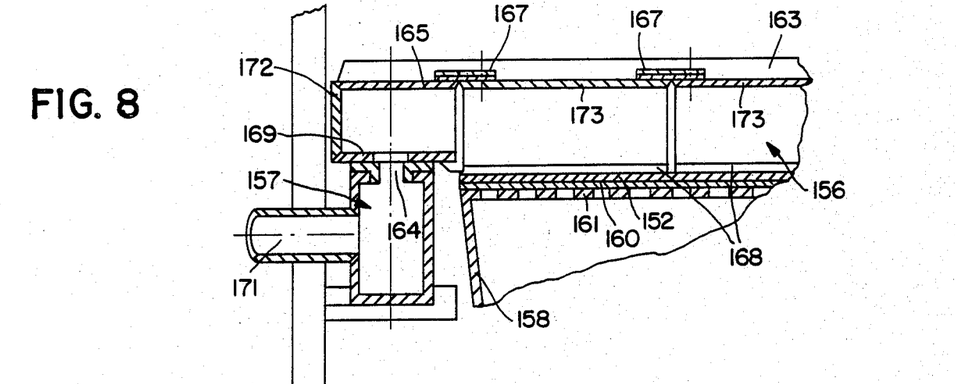
FIG. 8 is a cross-sectional view of a transition from a suction nozzle to a longitudinally extending duct taken along the line IV—IV in FIG. 2.
Figure 9:
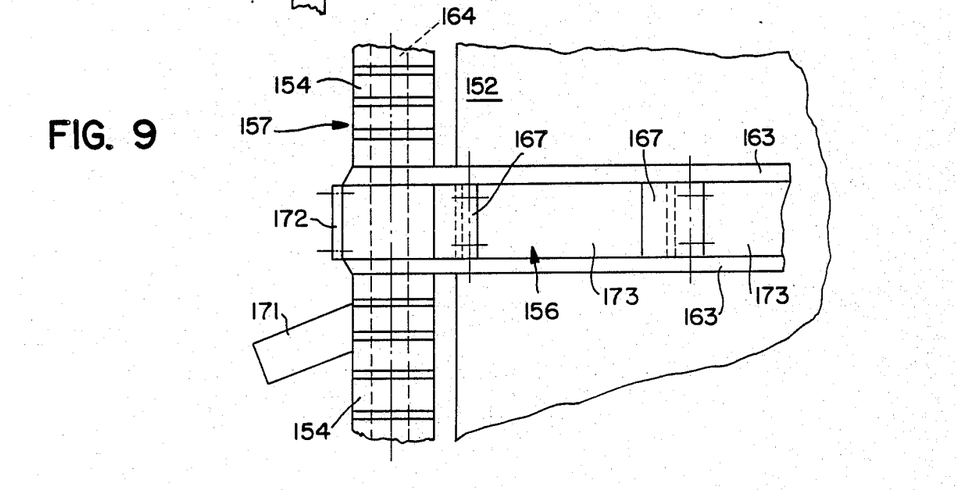
FIG. 9 is a partial schematic top view of a nozzle and nozzle holder as well as a belt drive means constructed in accordance with the present invention.
Figure 10:
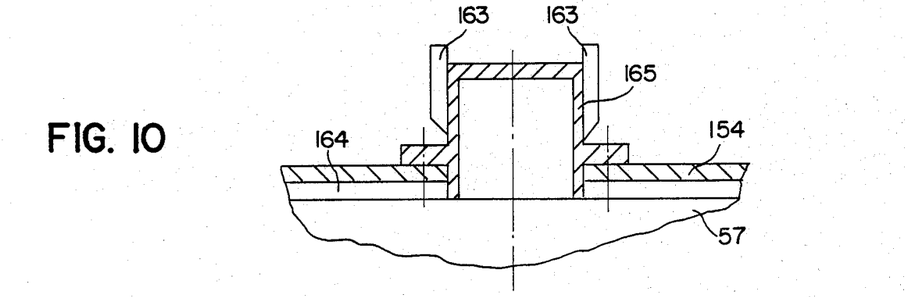
FIG. 10 is a cross-sectional view of a nozzle holder with a toothed belt mount taken along the line VI—VI in FIG. 6.

It is extremely important for the operation of the suction system of the present invention that the removal of powder by suction functions well since otherwise a cleaning is not ensured. As shown in FIGS. 8 and 9, the nozzle 156 is mounted in a guide frame 163, with the guide frame 163 being firmly connected on both sides with the toothed belt 154 and, for this purpose, as shown in FIG. 10, the belt 154 is interrupted or provided with a gap at this point with the free ends of the respective belts 154 being connected by the guide frame 163.

The guide frame 163 is constructed so that a transition of the air to a longitudinally extending duct 157 through a guide frame end section 165 is possible at the ends thereof. The guide frame end section 165 extends up to a beginning of the filter belt 152. Thus, the guide frame 163 includes two parallel ribs into which guide elements 173 forming the nozzle 156 are fitted.

The suction nozzle 156 is constructed so as to include one or more nozzle elements 173 depending on the width of the belt 152. The reason for this measure lies in the fact that the individual nozzle elements 173 can optimally adjust to any irregularities and inaccuracies in the bottom filter 152, that is, any irregularities in the suction system itself. The elements 173 at one end thereof are provided at the top and sides with resilient lips 167 made of, for example, rubber, and the nozzle elements 173 have, for example, a round or rectangular cross-section. Teflon coating 164 is applied to an underside thereof to keep belt abrasion and friction as low as possible. Longitudinally extending slots 64 serving for suction are either all fashioned to be in a range of 2 to 10 mm in width or disposed in two rows staggered relative to one another thereby improving the overall cleaning capabilities.

During operation, the powder-air mixture is guided through the guide frame end section 165 into a longitudinal duct 157 by reciprocating the suction nozzle 156. The duct 157 is provided on a top thereof with, for example, slots 164 of a round or rectangular cross-section. The guide 169 for the guide frame 163 runs inside and, additionally, the longitudinally extending or elongated slot 164 is covered by a drive belt 154, which is attracted by the vacuum prevailing in the longitudinal duct 157 and sealed thereby. The air-powder mixture is then conveyed through a suction stub 171 into the recycling system shown in FIG. 1 and described more fully hereinabove. Preferably, a plurality of suction stubs 171 are provided along the longitudinally extending duct 157 thereby allowing optimal selection of the position of the suction system. During a cleaning, a suction nozzle for the walls can, for example, be attached to one of the stubs 171.

In multi-color systems, a longitudinally extending duct 157 can be provided on either side of the chamber 51. When changing colors, it is then necessary to clean the nozzle elements and switch from one longitudinal channel 64 to the other. The suction unit can then be connected to the second longitudinal channel 157 or even be available as a second unit for the next color thereby saving time when changing colors since the cleaning cost is reduced. The longitudinal ducts 157 are sealed at their ends by lids 172 so that the duct can be cleaned quickly using brushes, if necessary. Similar lids may also be mounted on the sections 165 of the guide frame 163.

While I have shown and described only one embodiment in accordance with the present invention, it is understood that the same is not limited thereto but is susceptible to numerous changes and modification as known to one having ordinary skill in the art and I therefore do not wish to be limited to the details shown and described herein, but intend to cover all such modifications as are encompassed by the scope of the appended claims.

I claim:

1. An electrostatic powder coating installation comprising a cabinet means, means disposed in said cabinet means for discharging electrostatically charged powder, open ended filter strip means located in a bottom area of an inner space of the cabinet means and maintained in a stationary position during a powder coating operation, respective rollers supporting each end of the filter strip means, a first exhaust fan means for producing a suction field with vacuum in the cabinet means through the filter strip means, cleaning means located in said cabinet means and associated with the filter strip means for removing surplus powder lying on the filter strip means, and means for driving said rollers for displacing the filter strip means for at least one length of the cabinet means only upon a pigment change in the powder so as to enable an assigning of a portion of the filter strip means to respective pigments in the powder, wherein said cleaning means comprises a suction nozzle means and means for moving the suction nozzle means in a direction of the filter strip means extending between said rollers.

2. An electrostatic powder coating installation according to claim 1, further comprising a suction means adapted to be intermittingly operated.

3. An electrostatic powder coating installation according to claim 1, further comprising a fibrous web disposed beneath the filter strip means, and means for enabling a rolling and unrolling of the fibrous web.

4. A method of operating an electrostatic powder coating installation, the method comprising the steps of providing a filter strip means in a cabinet means, maintaining the filter strip means in a stationary position during a powder coating operation, and moving the filter strip means through the cabinet means of the electrostatic powder coating installation only when a pigment of the powder changes so as to position a portion of the filter strip means associated with the new pigment inside the cabinet means.

5. A method according to claim 4, further comprising the step of intermittingly operating a suction nozzle means.

6. A method according to claim 4, further comprising the step of maintaining a sealed containment-catching container means at the same pressure level as an area containing a filter means and a powder sifting means of the powder coating installation.

7. A powder coating chamber for an electrostatic powder coating installation, the chamber including a trough portion, at least one filter means disposed above said trough portion, at least one suction nozzle means cooperable with said filter means for removing excess powder therefrom, means for intermittently reciprocably moving said at least one suction nozzle means with respect to said filter means including at least one belt means, a suction blower means, means connecting said suction blower means to said suction nozzle means, said connecting means including at least one air suction exhaust duct means, said at least one air suction exhaust duct means receiving excess powder from the at least one suction nozzle means and delivering the same out of the coating installation, and said at least one air suction exhaust duct means including a slot mean therein sealed by said at least one belt means except in the vicinity of said connecting means.

8. A powder coating chamber according to claim 7, further comprising a transversely extending guide frame means for accommodating said at least one nozzle means, said guide frame means being connected to the at least one belt means in such a manner that a powder air stream passes through the at least one nozzle means and a portion of the guide frame means in each position and into said at least one air suction exhaust duct means.

9. A powder coating chamber according to claim 7, further comprising a guide frame means for accommodating the at least one nozzle means, said at least one nozzle means including a plurality of nozzle elements, and wherein lip means are provided for sealing said nozzle elements with respect to each other.

10. A powder coating chamber according to claim 7, wherein said slot means is a slot extending across an entire longitudinal section of the at least one air suction exhaust duct means, and wherein removable cover means are provided for sealing respective ends of said at least one air suction exhaust duct means.

11. A powder coating chamber according to claim 8, wherein an air suction exhaust duct means is provided on opposite sides of the chamber, and wherein additional nozzle means are provided for enabling an ultimate shifting of the suction from one of the air suction exhaust duct means on one side of the chamber to the other air suction exhaust duct means.

12. A powder coating chamber according to claim 7, further comprising a further connection means for enabling a connection with a suction hose means for cleaning the chamber.

13. A powder coating chamber according to claim 7, wherein the at least one drive belt is a toothed belt.

14. A powder coating chamber according to claim 7, wherein said means for reciprocably moving said at least one suction nozzle means includes a slip clutch.

15. A suction system for powder material of an electrostatic powder coating installation, the suction system including at least one movable suction nozzle means for removing excess powder from a powder coating chamber of the installation, at least one suction blower means connected to said at least one movable suction nozzle by way of connecting means, means for reciprocably moving said at least one suction nozzle means including at least one drive belt means, for moving the at least one nozzle means transversely with respect to an air suction channel of said connecting means having an opening extending along one longitudinal side thereof, which opening is sealed by said at least one drive belt means except in the vicinity of said connecting means.

* * * * *